INVENTOR.
Thomas E. Myers,
BY Parker & Carter
Attorneys.

INVENTOR.
Thomas E. Myers,
BY Parker & Carter
Attorneys.

United States Patent Office 3,320,438

Patented May 16, 1967

3,320,438

HUMAN CONTACT CONTROLLED SWITCHING CIRCUIT USING A MULTIVIBRATOR AND BISWITCH

Thomas E. Myers, St. Charles, Ill., assignor to Ideal Industries, Inc., Sycamore, Ill., a corporation of Delaware Filed Nov. 12, 1964, Ser. No. 410,595
10 Claims. (Cl. 307—88.5)

This invention relates to a switching circuit arranged for multivibrator or bistable circuit operation, and has particular relation to such a circuit using a semiconductor biswitch in series with the load.

One purpose of the invention is a circuit of the type described, which is reliable in operation and which may be miniaturized to a large extent.

Another purpose is a circuit of the type described satisfactory for passing current through any type of load, whether it be a relay, an electric light fixture, a motor, or the like.

A principal purpose of the invention is to provide a simplified and controlled method of operating a control circuit using a semiconductor biswitch.

Another purpose is a control circuit of the type described including a rheostat for varying the period of biswitch conduction.

Other purposes will appear in the ensuing specification, drawings and claims.

The invention is illustrated diagrammatically in the following drawings wherein.

The invention may be described generally as a control circuit suitable for connecting a load to a source of power. In the alternative, the circuit may actuate a relay coil whose contacts perform a control function. The signal for actuating the circuit may come from an antenna. The antenna may have a surface positioned for and adapted for human contact so that the potential of the body applied to the antenna is sufficient to operate the circuit. In the alternative, there may be two adjacent antennas positioned such that human contact bridges or shorts the two antennas together to thereby connect a previously established voltage, for example from one side of the source, to operate the circuit.

Figure 1:
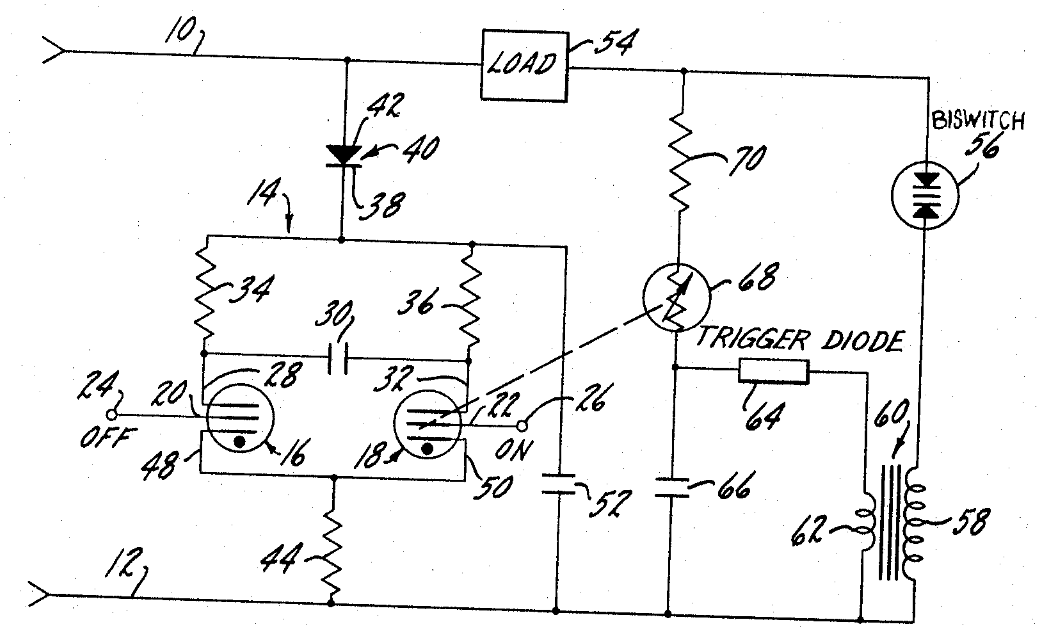
FIGURE 1 is a circuit diagram of one form of control circuit utilizing a phototube to initiate operation of the biswitch.

In still another form of operation, human contact at the touch surface may be effective through a momentary contact shorting arrangement to apply a predetermined voltage to an antenna to operate the circuit. Such a circuit would be particularly useful when the person contacting the touch surface is wearing gloves. In another form of operation, there may be a number of separate antennas positioned at different points, with the application of a potential to any one of these antennas being sufficient to operate the circuit. In still another application of this circuit, potential for operating the circuit may be applied to the antenna from a completely separate source of voltage. In FIGURE 1 a suitable source of electric power, for example 117-volt A.C. source, may be applied between lines 10 and 12. A bistable circuit is indicated generally at 14 and may be in the form of a bistable multivibrator with each side of the multivibrator including a gas tube, for example an NE–77, or any other satisfactory tube of this general type. The tubes 16 and 18 may each have grids or gates 20 and 22 respectively which are connected to touch control surfaces or antennas 24 and 26. As shown in FIGURE 1, antenna 24 is the "off" antenna and antenna 26 is the "on" contact. Element 28 of tube 16 is connected by a capacitor 30 to corresponding element 32 of tube 18. Resistors 34 and 36 respectively connect elements 28 and 32 to the cathode 38 of a diode indicated generally at 40. The anode 42 of diode 40 may be connected to the line 10. At the other end of the bistable circuit, a resistance 44 is connected to elements 48 and 50 respectively of tubes 16 and 18. A stabilizing capacitor 52 may be connected from one end of resistor 36 to line 12.

The load is indicated at 54 and may be any of the various elements described heretofore. The load is in series with a semiconductor biswitch 56 which may be an element of the type manufactured by the Transistron Electronics Corporation of Wakefield, Mass. The biswitch 56 is in series with the secondary 58 of a transformer or torroid 60. The primary 62 of the torroid 60 is in series with a trigger diode 64. A phase shifting capacitor 66 may be connected between line 12 and the trigger diode 64.

The circuit of FIGURE 1 is completed by a phototube 68 connected with a current limiting resistor 70 between line 10 and the trigger diode 64. The phototube 68 should be positioned relative to tube 18 such that when tube 18 is ignited or emits light, this light will be effective to cause the phototube to conduct and to pass current to the trigger diode 64.

In operation, assuming the circuit of FIGURE 1 is connected across an A.C. line, when either antenna 24 or antenna 26 receives a potential, ionization of the tube associated with that antenna takes place and that side of the circuit will conduct. Assuming first of all that antenna 24 receives a potential, then tube 16 will ignite and the circuit will be in the "off" condition in the sense that no current will be passing through load 54. When antenna 26 receives a potential, tube 18 will conduct and the circuit will switch from one stable condition to the other. When tube 18 conducts, the light from this tube will be effective to cause phototube 68 to conduct. A voltage will thereafter be applied to trigger diode 64. This element can be a diode in either direction up to a certain potential, for example 30 volts. After the potential across the diode reaches about this level, the diode will then conduct in either direction. When the diode first conducts, there is an avalanche of electron movement within the diode with the effect that a large spike or peak of voltage will be applied to the primary 62 of the transformer 60. This peak of voltage will be amplified by the transformer and a larger peak will be applied by the secondary to the semiconductor biswitch 56. The biswitch will then break over and will conduct to permit current to pass through load 54. The biswitch will continue to conduct as long as the potential applied across it has the same polarity. When the applied A.C. wave switches polarity, the biswitch will cut off. However, because the trigger diode 64 will conduct in either direction, it will supply a second peak of voltage to the transformer 60 during the next half cycle with the result that the biswitch will again conduct, this time current flow being in the opposite direction through load 54. In effect, the biswitch conducts on each half cycle for a time determined by the phase shifting network made up of capacitor 66 and resistor 70 and the particular characteristics of trigger diode 64. Once the biswitch is conducting, it will remain in a conducting state until the voltage swings to the opposite polarity. Current will continue to pass through the load, as long as tube 18 is conducting or until a potential is applied to the "off" contact or antenna 24.

Figure 2:
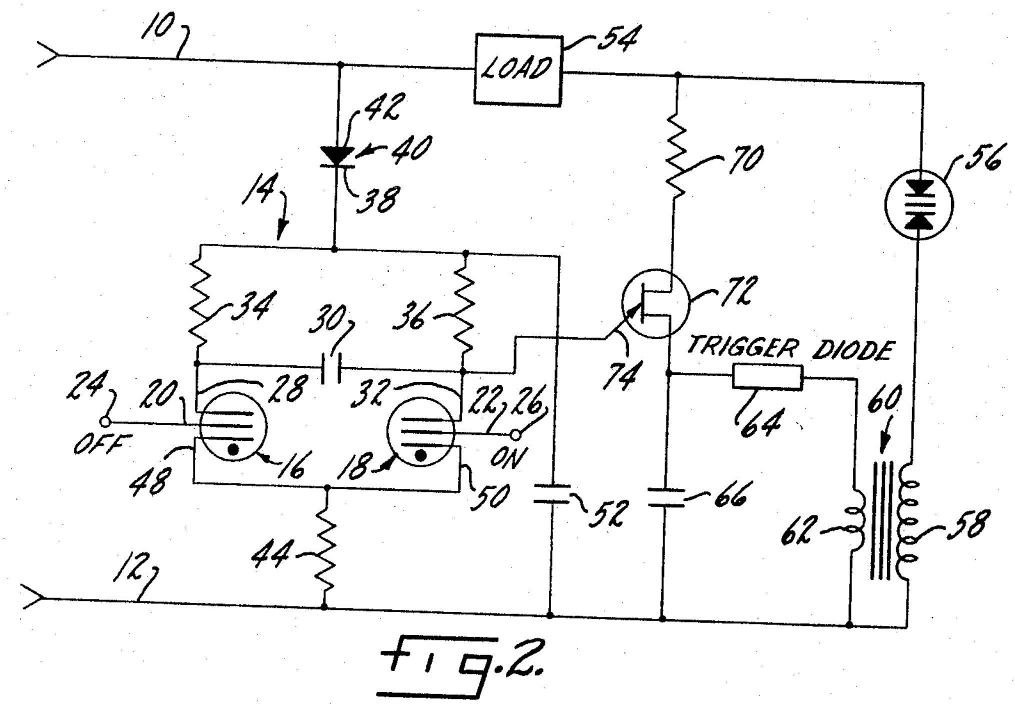
FIGURE 2 is a circuit diagram of a control circuit, similar to FIGURE 1, but utilizing a transistor to initiate operation of the biswitch.

FIGURE 2 is substantially similar to FIGURE 1 and only elements which are different from FIGURE 1 will be described. A transistor 72 which may be a unijunction transistor or otherwise may have its emitter 74 connected to element 32 of tube 18. Whenever tube 18 is conducting, a potential will be applied directly to emitter 74 to cause the transistor to conduct. Whenever the right hand side of circuit 14 is conducting, transistor 72 will be effective to apply a voltage to the trigger diode 64 so that this diode may operate the biswitch in the manner described above.

Figures 3, 4, 5:
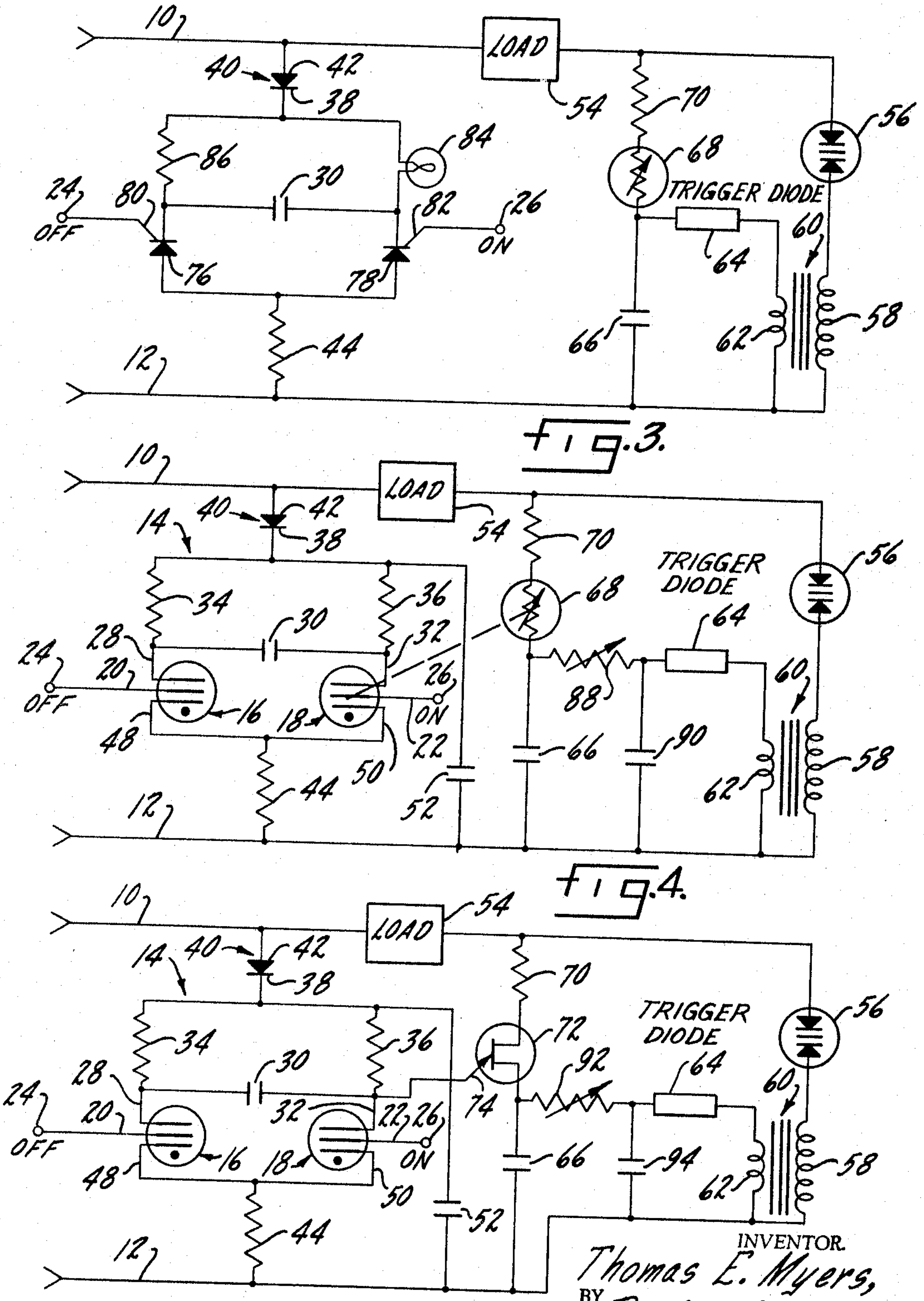
FIGURE 3 is a circuit diagram of a further form of control circuit utilizing silicon controlled rectifiers in the bistable circuit.
FIGURE 4 is a control circuit, similar to FIGURE 1, but providing a variable resistor to control the period of operation of the biswitch.
FIGURE 5 is a control circuit, similar to FIGURE 2, and with a variable resistor modification as shown in FIGURE 4.

Turning now to FIGURE 3, bistable circuit 14 includes a pair of silicon controlled rectifiers 76 and 78, with the rectifiers having gates 80 and 82 respectively, and with these gates being connected to the "on" and "off" antennas or contacts 24 and 26. In series with SCR 78 is an incandescent lamp or the like 84 which should have somewhat the same resistance as resistance 86 in series with SCR 76. Whenever a potential is applied to contact or antenna 26, SCR 78 will conduct, in a conventional manner, with the result that current will flow through lamp 84 and the light from this lamp will be used to activate phototube 68. The circuit will then operate in the same manner as FIGURE 1. The bistable circuit or multivibrator of FIGURE 3 uses SCR's, which are conventional elements, in place of the gas tubes shown in FIGURES 1 and 2.

In FIGURE 4, a phase shifting network made up of a variable resistance 88 and a capacitor 90 has been added between the phototube 68 and trigger diode 64 of FIGURE 1. The variable resistance 88 is used to control the period of conduction of the biswitch during each 180 degrees of the applied sine wave and may be considered a dimmer control when used in home wiring.

FIGURE 5 adds the same modification to FIGURE 2. A variable resistance 92 and a capacitor 94 are connected between transistor 72 and diode 64. Although not shown, the same additional control can be added to the circuit of FIGURE 3.

The use, operation and function of the invention are as follows:

All of the control circuits shown utilize a semiconductor biswitch, which will break over and conduct when a sufficient potential is applied across its terminals. The biswitch is in series with the load, which may be a relay, or it may be the element utilizing the current from the source, for example a light or a motor. Whenever the biswitch conducts, current will pass through the load. When the biswitch and the load are across an A.C. source, the biswitch will conduct on both halves of the A.C. sine wave, and for a period determined by the time of application of the control potential to the biswitch.

In each of the various circuits the biswitch is operated by means of a trigger diode which supplies a large pulse of voltage to the primary of a torroid, with the secondary of the torroid applying this voltage to the biswitch to cause it to conduct. The time at which the pulse of voltage is applied by the trigger diode to the torroid is determined by a phase shifting capacitor and a resistor which is in series with it. A variable resistor may be added to the phase shifting network for further control of load current.

The biswitch is turned on and off by means of a bistable circuit or a multivibrator, which may include a pair of gas tubes or gas bulbs, for example an NE–77 is a satisfactory type of tube, as are many other similar gas bulbs. Gated semiconductor rectifiers, for example silicon controlled rectifiers may also be used to form a satisfactory bistable circuit. Regardless of the type of element used to operate the multivibrator circuit, it is preferred that the operating potential for changing the multivibrator from one stable condition to the other, be applied by touch surfaces or antennas which are suitable for human contact. As an example of the use of the present invention, it may be utilized to turn lights or appliances on and off in the home. When this is the case, the touch surfaces may have a high resistance between the contact point and the bistable circuit to isolate the operator from any possible shock. In any event a potential applied to an antenna will change the bistable circuit from one stable condition to the other. When the "on" contact receives a potential, either a phototube may be operated to provide the necessary voltage to open the biswitch, or a transistor may receive an operating potential on its emitter.

The invention should not be limited to the particular types of multivibrator circuits shown, as many other elements may be utilized for forming a satisfactory bistable circuit. In like manner, the invention should not be limited to phototubes or unijunction transistors for applying an operating voltage to the trigger diode. Other arrangements may be satisfactory. For example, any element which is actuated in response to a signal and remains in a conducting state as long as the signal continues is satisfactory. A semiconductor device such as shown in Patent 2,978,618 is acceptable.

Whereas the preferred form of the invention has been shown and described herein, it should be realized that there are many modifications, substitutions and alterations thereto within the scope of the following claims.

I claim:

1. In a control circuit for connection to a source of power, a bistable circuit connected across said source, means for causing said bistable circuit to switch from one stable stage to the other, including a pair of spaced antenna means each connected to one side of said bistable circuit for switching said bistable circuit upon human contact, a load and a semiconductor biswitch connected in series across said source, a transformer having a primary coil and secondary coil with the secondary coil being in series with said biswitch, means in series with the primary coil and cooperating with said bistable circuit for applying a voltage to the primary coil when said bistable circuit is in one condition, but applying no voltage to the primary coil when said bistable circuit is in the other condition, the application of a voltage to the primary coil providing a sufficient voltage on the secondary coil to cause said biswitch to conduct and to permit current to flow through said load.

2. The circuit of claim 1 further characterized in that said bistable circuit includes a pair of gated gas tubes, one on each side of said bistable circuit.

3. The circuit of claim 2 further characterized in that the means in series with the primary coil and cooperating with said bistable circuit includes a phototube, exposed to one of said gas tubes, and a trigger diode connected between the primary coil and the phototube.

4. The circuit of claim 3 further characterized by and including a phase shifting network for controlling the period of conduction of said biswitch.

5. The circuit of claim 4 further characterized in that said phase shifting network includes a variable resistance between said phototube and trigger diode.

6. The circuit of claim 2 further characterized by and including a pair of spaced touch surfaces, with each touch surface being connected to the gate of one of said gas tubes.

7. The circuit of claim 1 further characterized in that the means in series with the primary coil and cooperating with said bistable circuit for applying a voltage to the primary coil, includes a phototube and a trigger diode in series with said transformer primary.

8. The circuit of claim 7 further characterized in that said bistable circuit includes a pair of gated semiconductor rectifiers, one for each side thereof, and a light emitting resistance in series with one of said rectifiers and positioned to expose said phototube.

9. The circuit of claim 1 further characterized in that the means in series with said primary coil and cooperating with said bistable circuit for applying a voltage to said primary coil includes a transistor and a trigger diode in series with said primary coil, one terminal of said transistor being connected to one side of said bistable circuit, with the other terminals being connected to said trigger diode and said load.

10. The circuit of claim 9 further characterized by and including a variable resistance between said transistor and trigger diode for varying the power output of the circuit.

References Cited by the Examiner

UNITED STATES PATENTS

| | | | |
|---|---|---|---|
| 3,165,633 | 1/1965 | Wunderman et al. | 307—88.5 |
| 3,188,490 | 6/1965 | Hoff et al. | 307—88.5 |
| 3,237,109 | 2/1966 | Minard | 307—88.5 |

DAVID J. GALVIN, *Primary Examiner.*

ARTHUR GAUSS, *Examiner.*

J. HEYMAN, *Assistant Examiner.*